(12) United States Patent
Pahalawatta et al.

(10) Patent No.: US 8,938,011 B2
(45) Date of Patent: Jan. 20, 2015

(54) METHODS AND SYSTEMS FOR REFERENCE PROCESSING IN IMAGE AND VIDEO CODECS

(75) Inventors: Peshala V. Pahalawatta, Glendale, CA (US); Alexandros Tourapis, Milpitas, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 297 days.

(21) Appl. No.: 13/522,941

(22) PCT Filed: Jan. 5, 2011

(86) PCT No.: PCT/US2011/020168
§ 371 (c)(1),
(2), (4) Date: Jul. 18, 2012

(87) PCT Pub. No.: WO2011/094034
PCT Pub. Date: Aug. 4, 2011

(65) Prior Publication Data
US 2012/0288013 A1   Nov. 15, 2012

Related U.S. Application Data

(60) Provisional application No. 61/298,907, filed on Jan. 27, 2010.

(51) Int. Cl.
*H04N 7/12*   (2006.01)
*H04N 11/02*  (2006.01)
*H04N 11/04*  (2006.01)
(Continued)

(52) U.S. Cl.
CPC ... *H04N 19/00175* (2013.01); *H04N 19/00769* (2013.01); *H04N 19/00066* (2013.01); *H04N 19/00321* (2013.01); *H04N 19/00351* (2013.01); *H04N 19/00357* (2013.01);
(Continued)

(58) Field of Classification Search
None
See application file for complete search history.

(56) References Cited

U.S. PATENT DOCUMENTS 5,619,256 A   4/1997   Haskell
6,144,701 A   11/2000  Chiang
(Continued)

FOREIGN PATENT DOCUMENTS

EP   1720358     11/2006
JP   H11-341521  12/1994
(Continued)

OTHER PUBLICATIONS

Kitahara, M. et al "Multi-View Video Coding Using View Interpolation and Reference Picture Selection" IEEE International Conference on Multimedia and Expo, Jul. 9-12, 2006, pp. 97-100.
(Continued)

*Primary Examiner* — Dave Czekaj
*Assistant Examiner* — Nam Pham

(57) ABSTRACT

Multi-layer encoding and decoding systems and methods are provided. A processing module processes outputs of a first base or enhancement layer and sends the processed outputs to a second, enhancement layer. Operation of the processing module is controlled, so that the second layer can receive processed or unprocessed outputs of the first layer in accordance with the circumstances. Processing of the outputs of the first layer can occur together with or separately from a disparity compensation process.

11 Claims, 11 Drawing Sheets

(51) Int. Cl.

| | |
|---|---|
| *H04N 19/147* | (2014.01) |
| *H04N 19/597* | (2014.01) |
| *H04N 19/117* | (2014.01) |
| *H04N 19/187* | (2014.01) |
| *H04N 19/19* | (2014.01) |
| *H04N 19/192* | (2014.01) |
| *H04N 19/176* | (2014.01) |
| *H04N 19/61* | (2014.01) |
| *H04N 19/82* | (2014.01) |
| *H04N 19/33* | (2014.01) |

(52) U.S. Cl.
CPC .. *H04N 19/00278* (2013.01); *H04N 19/00781* (2013.01); *H04N 19/00896* (2013.01); *H04N 19/00436* (2013.01)
USPC .......... 375/240.25; 375/240.26; 375/E07.027

(56) References Cited

U.S. PATENT DOCUMENTS 8,599,981 B2 * 12/2013 Oshikiri .................. 375/350

| | | |
|---|---|---|
| 2007/0064800 A1 | 3/2007 | Ha |
| 2012/0026288 A1 | 2/2012 | Tourapis |
| 2012/0092452 A1 | 4/2012 | Tourapis |

FOREIGN PATENT DOCUMENTS

| | | |
|---|---|---|
| JP | 2009-522932 | 6/2009 |
| WO | 2009/088976 | 7/2009 |
| WO | 2009131688 | 10/2009 |
| WO | 2009/151563 | 12/2009 |
| WO | 2010/123862 | 10/2010 |

OTHER PUBLICATIONS

Itu T "Advanced Video Coding for Generic Audiovisual Services" Series H: Audiovisual and Multimedia Systems, Mar. 2009.

Vatis, Y. et al., "Motion-and-Aliasing-Compensated Prediction Using a Two-Dimensional Non-Separable Adaptive Wiener Interpolation Filter", ITU-T SGI 6, Busan, Korea, Apr. 2005.

* cited by examiner

METHODS AND SYSTEMS FOR REFERENCE PROCESSING IN IMAGE AND VIDEO CODECS

CROSS-REFERENCE TO RELATED APPLICATIONS

This application claims priority to U.S. Patent Provisional Application No. 61/298,907, filed 27 Jan. 2010, hereby incorporated by reference in its entirety.

FIELD

The present disclosure relates to image and video coding and/or decoding systems. In particular, methods and systems for reference processing in image and video codecs are disclosed.

BACKGROUND

The provision of a stereoscopic (3D) user experience has been a long held goal of both content providers and display manufacturers. Recently, the urgency of providing a stereoscopic experience to home users has increased with the production and release of multiple popular 3D movies and other 3D material such as sports events, concerts and documentaries. A number of methods have been proposed that would enable the delivery of stereoscopic 3D content to home users. One technique that has been proposed is to multiplex the two stereoscopic views into a single frame configuration (frame compatible) using a variety of filtering, sampling, and arrangement methods. Sampling could, for example, be horizontal, vertical, or quincunx, while an offset could also be considered between the two views allowing better exploitation of redundancies that may exist between them. Similarly, arrangements could be side-by-side, over-under, line-interleaved, and checkerboard packing among others.

The above methods, however, require each view to be downsampled to half the original resolution. Therefore, a number of methods have been proposed that would enable the delivery of full resolution 3D. One method is to utilize two separate and independent bitstreams (simulcast), where each bitstream represents a different view (e.g., left and right eye). This method, however, is complex in terms of storage and bandwidth requirements since the redundancies that exist between the two views are not exploited. An extension of this method that tries to exploit some of the redundancies was proposed and adopted as the Multiview Video Coding (MVC) extension of the MPEG-4 AVC/H.264 video coding standard. See Advanced video coding for generic audiovisual services, http://www.itu.int/rec/recommendation.asp?type=folders&lang=e&parent=T-REC-H.264, March 2009, incorporated herein by reference in its entirety. This method is a scalable system that delivers one view as a base layer image and the other view or views as enhancement layers. In this case, redundancies among the views are exploited using only translational motion compensation based methods, while the system is based on "intelligent" reference buffer management for performing prediction compared to the original design of MPEG-4 AVC. Unfortunately, even though coding efficiency was somewhat improved (20-30% over simulcast), the reliance on translational only motion compensation limits the performance of this scheme. Another method that uses an affine model to generate a prediction of one view from the other view is proposed in U.S. Pat. No. 6,144,701, also incorporated herein by reference in its entirety.

Other applications that are of considerable interest include scalable video delivery applications (e.g., 2D scalable video encoding) where it is desirable that a video signal is encoded using multiple layers, each layer enabling a different quality level or resolution (spatial or temporal) of the video signal.

DESCRIPTION OF EXAMPLE EMBODIMENTS

Figure 1:
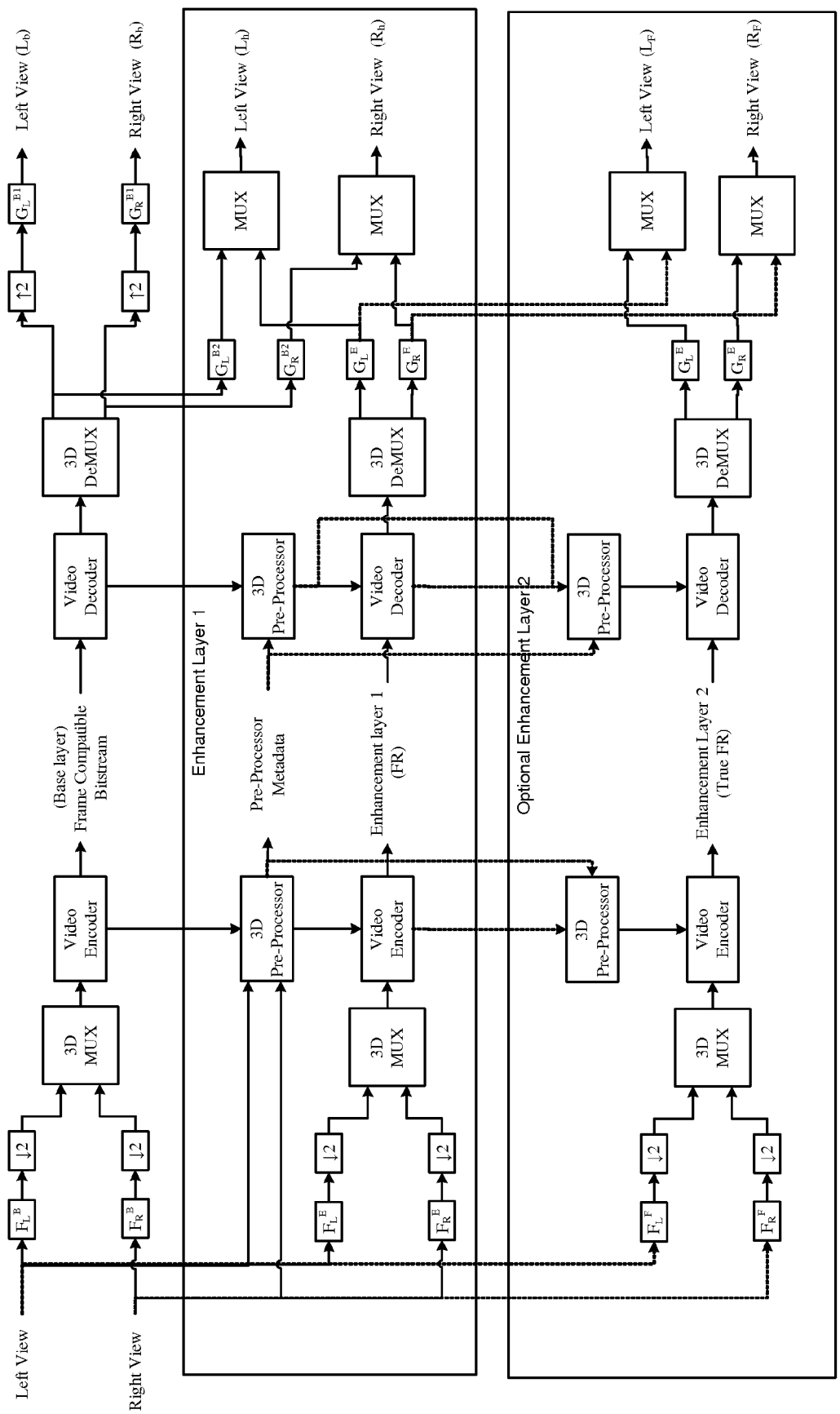
FIGS. 1 and 2 show and example of a frame compatible 3D architecture.

According to a first aspect, a multi-layered video decoding system is provided, comprising: a first layer, comprising a first layer video decoder; a second layer, associated with the first layer, the second layer comprising a second layer video decoder; a processing selector, to select whether to process the output of the first layer video decoder and input the processed output into the second layer video decoder or not; a processing module, located downstream of the processing selector, to process, upon instruction of the processing selector, the output of the first layer video decoder and input the processed output into the second layer video decoder.

According to a second aspect, a video decoder is provided, comprising: a decoding loop, adapted to receive an encoded signal and to output a decoded signal; a processing module, connected with the decoding loop, the processing module adapted to receive a decoded input signal and to send a processed decoded input signal to the decoding loop; and a selector, connected with the processing module, adapted to receive the decoded input signal and select whether to send the decoded video signal to the processing module or not.

According to a third aspect, a method to selectively process decoded video information is provided, comprising: providing a first layer video decoder and a second layer video decoder; selecting whether to (a) process the output of the first layer video decoder or (b) not process the output of the first layer video decoder; and in case of (a), processing the output of the first layer video decoder and inputting the processed output into the second layer video decoder.

According to a fourth aspect, a method to selectively perform disparity compensation in a video decoding system is provided, comprising: providing a decoded video signal; selecting whether (a) to use or (b) not to use information related to the decoded video signal; in case of (a) processing the decoded video signal and performing disparity compensation on the basis of the processed decoded video signal; in case of (b) performing disparity compensation independently of the decoded video signal.

According to a fifth aspect, a method to selectively perform disparity compensation in a video decoding system is provided, comprising: providing a decoded video signal; selecting whether (a) to use or (b) not to use information related to the decoded video signal; in case of (a) performing a first disparity compensation, the first disparity compensation based on processing of the decoded video signal and performed concurrently therewith; in case of (b) performing a second disparity compensation different from the first disparity compensation.

According to a sixth aspect, a multi-layered encoding system is provided, comprising: a first layer, comprising a first layer video encoder; a second layer, associated with the first layer, the second layer comprising a second layer video encoder, the second layer video encoder comprising a disparity estimation module and a disparity compensation module; a processing module to process an output of the first layer video encoder and input the processed output into the disparity estimation module and the disparity compensation module.

According to a seventh aspect, a multi-layered encoding system is provided, comprising: a first layer, comprising a first layer video encoder; a second layer, associated with the first layer, the second layer comprising a second layer video encoder, the second layer video encoder comprising a disparity estimation module, a disparity compensation module and a processing module, wherein the processing module is combined with the disparity compensation module; and the disparity estimation module and the disparity compensation module receive an output of the first layer video encoder.

According to an eighth aspect, a multi-layered encoding system is provided, comprising: a first layer, comprising a first layer video encoder; a second layer, associated with the first layer, the second layer comprising a second layer video encoder; a processing selector, to select whether to process the output of the first layer video encoder or not; and a processing module to process, upon instruction of the processing selector, the output of the first layer video encoder, wherein the processed output of the first layer video encoder and the unprocessed output of the first layer video encoder are sent to the second layer video encoder.

According to a ninth aspect, a method to decode an image frame or slice comprising a first block and a second block is provided, comprising: decoding samples of the image frame or slice with a first layer decoder of a multi-layer decoding system; processing the decoded samples; sending the processed decoded samples to a second layer decoder of the multi-layer video system; generating from the processed decoded samples a first block of the image frame through a disparity compensation process; and generating from the processed decoded samples a second block of the image frame through the disparity compensation processed, wherein a portion of the processed decoded samples adopted to generate the second block is taken from stored or pre-analyzed processed decoded samples already used to generate the first block.

Further embodiments of the disclosure are provided in the specification, drawings and claims of the present application.

Figure 2:
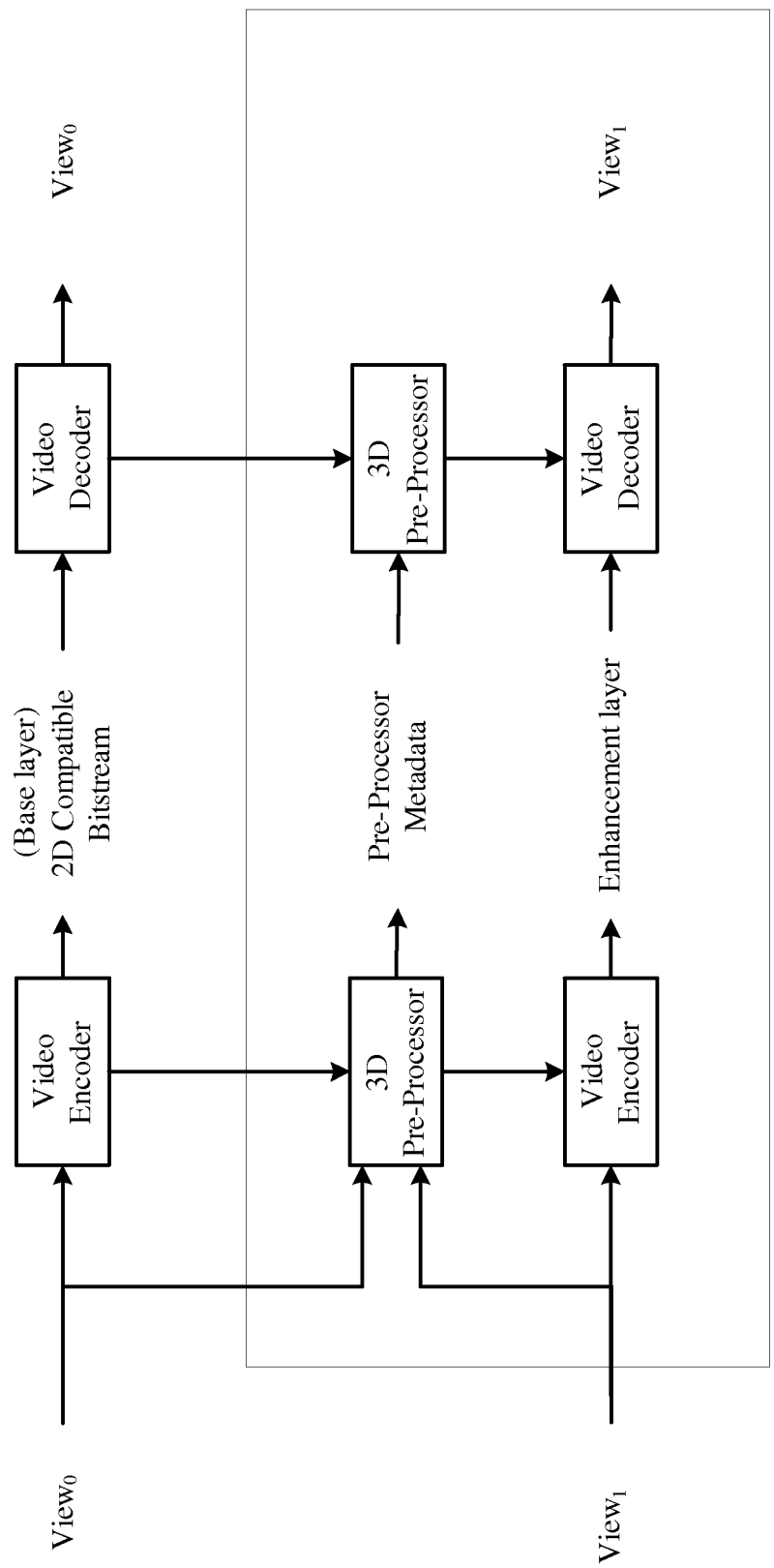

In U.S. Provisional Application 61/223,027 filed on Jul. 4, 2009 and U.S. Provisional Application 61/170,995 filed on April 2009, both of them incorporated herein by reference in their entirety, architectures are disclosed that can be used to enhance the performance of MVC-like (2D compatible) schemes but can also be used as part of a scalable frame compatible full resolution 3D delivery scheme or a scalable multi-layered scheme in general, e.g., a scalable multi-layered 2D scheme. The architecture of U.S. Provisional Application 61/223,027, assuming support of two layers, a base layer and an enhancement layer, adds a reference processing unit (RPU) component that may impose a processing step on the decoded pictures coming from the base layer prior to using them as reference pictures for the enhancement layer. See also FIGS. 1 and 2 where a frame compatible 3D architecture and a 2D compatible architecture are shown, respectively. The consideration of the RPU, however, could potentially increase the computational complexity and memory requirements of a device that implements the process.

The present disclosure presents embodiments that enable an architecture such as the architecture of U.S. Provisional Application 61/223,027 to be implemented while minimizing memory requirements and reducing the computational complexity of the RPU.

Figure 3:
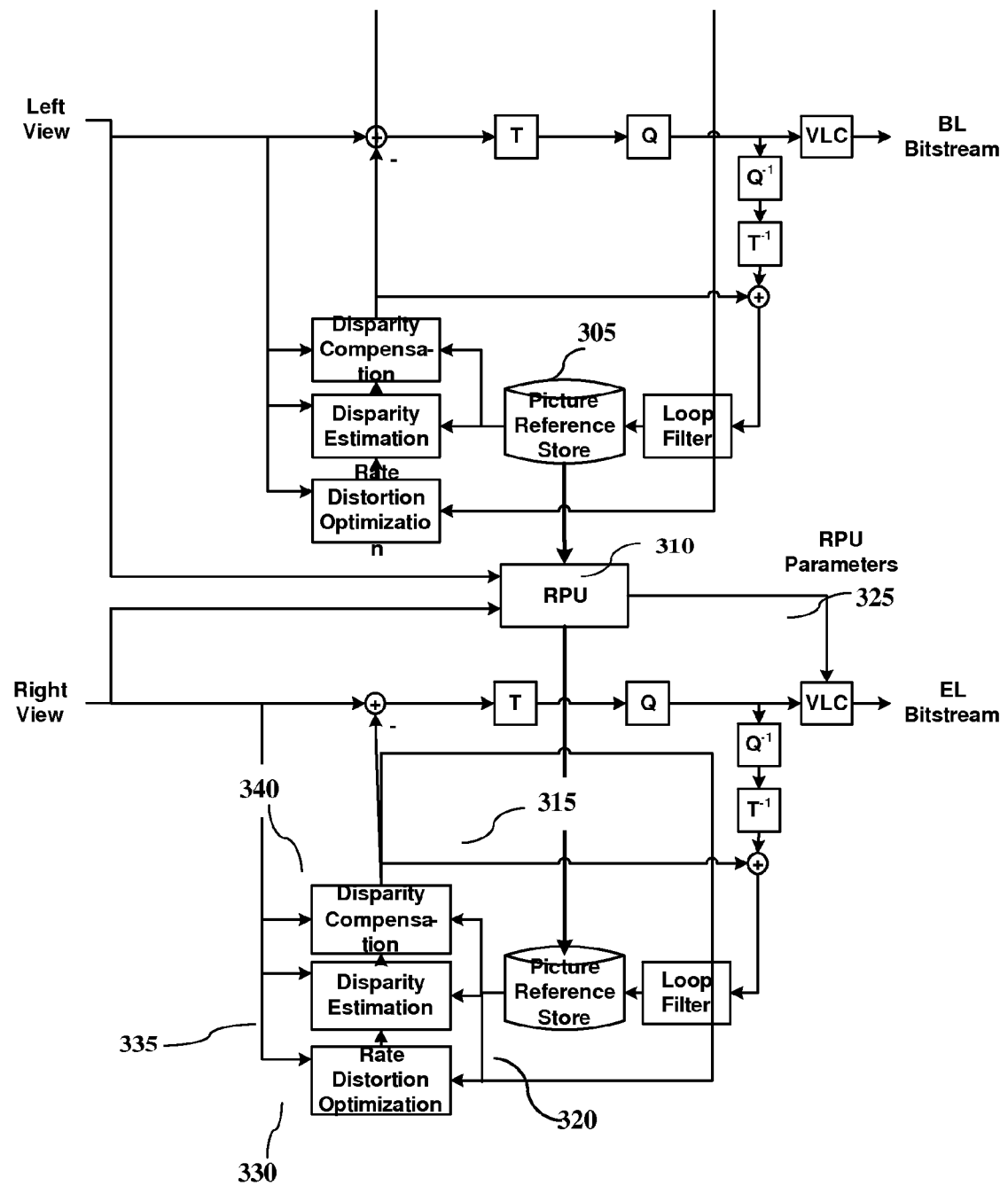
FIGS. 3 and 4 show possible encoder side realizations of the architecture of FIGS. 1 and 2.
Figure 4:
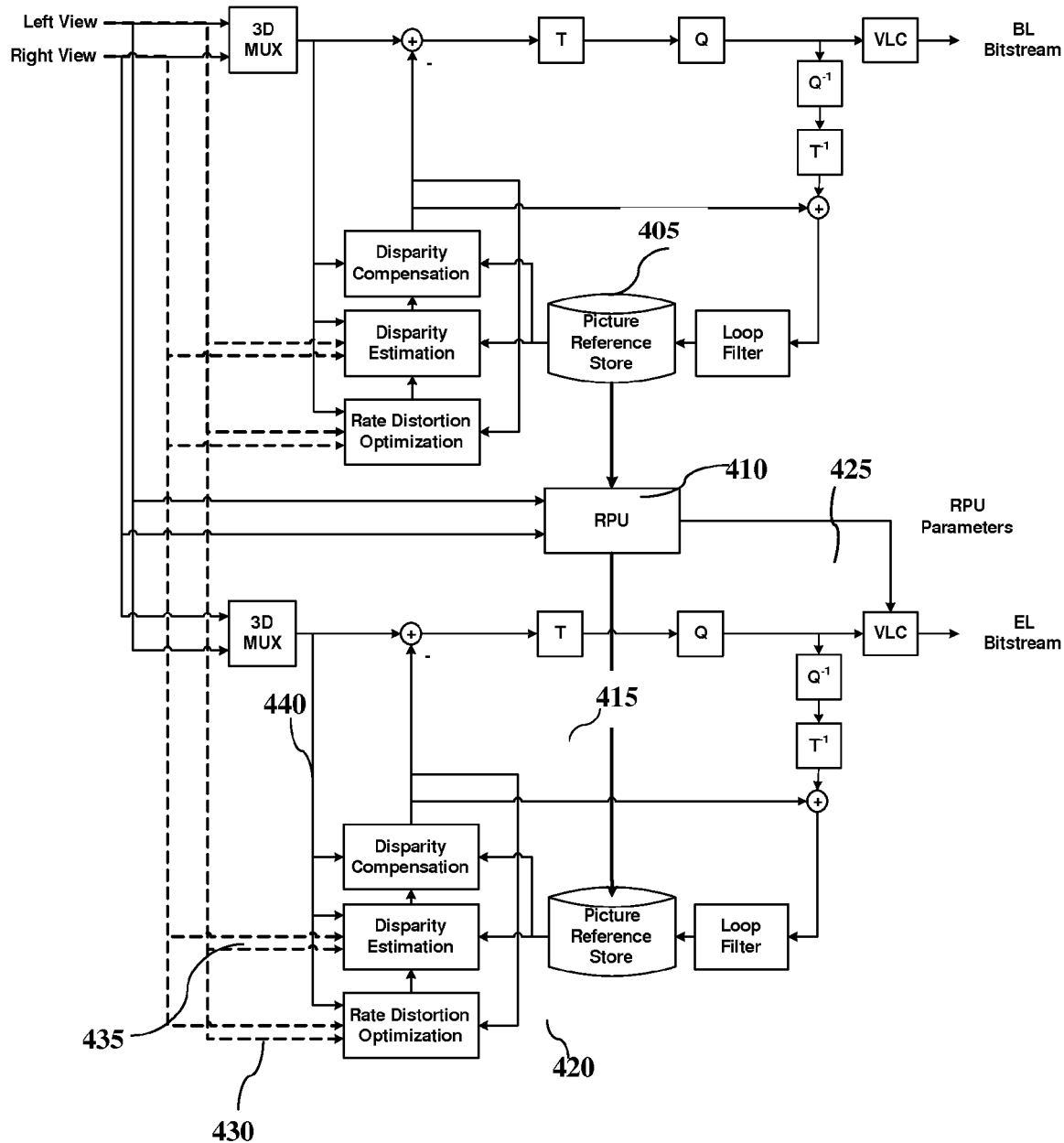

FIG. 3 and FIG. 4 provide diagrams of the encoder architecture used for a system that contains a particular implementation of the RPU. The person skilled in the art will understand that although some examples of the present disclosure are directed to a two-layer system, the same principles may also be applied for multi-layer systems that may contain multiple RPU components between the layers. By way of example and not of limitation, the multi-layer systems can comprise a base layer and one or more enhancement layers.

In accordance with what shown in FIGS. 3 and 4, the base layer (BL) reconstructed images are stored in a reference picture buffer (305, 405) in the base layer but are also processed (310, 410), given appropriate information that is included in the bitstream, to obtain a suitable prediction (315, 415) for the enhancement layer (EL). A suitable prediction may be derived using a combination of coding criteria such as rate distortion characteristics, the complexity of the processing scheme, etc.

The processing may include interpolation, low pass, or high pass filtering, phase shift, sharpening, and so on, and as specified, for example, in U.S. Provisional Application 61/170,995, each type of filter may be applied on the entire image, or different filters may be applied on a per-region, per-view, per chroma component basis, etc. The processed base layer images are then stored in a reference picture buffer (320, 420) of the enhancement layer and the reference processing filter information (325, 425) is signaled to the decoder. The reference picture buffer (320, 420) of the enhancement layer may also contain other, past, base layer references and/or temporal references based on enhancement layer reconstructed images as well. Then, the enhancement layer is encoded given, commonly, a rate distortion optimized decision mechanism (330, 430). According to such decision mechanism (330, 430), for each region (e.g., Macroblock or block of pixels) of the enhancement layer image to be coded, a best prediction (according to some coding criterion) method is determined given the available coded samples or references that may have previously been stored in the reference picture buffer (320, 420). The rate distortion optimization (330, 430) and disparity estimation (335, 435) processes determine the appropriate block/macroblock modes and prediction parameters such as disparity vectors, references, weights, offsets, etc., that are then used in the disparity compensation process (340, 440) to generate the final prediction of the enhancement layer image to be coded, and are also signaled to the decoder in the EL bitstream. Quantization parameters and transformed and coded residual information may also be signaled in an effort to reduce any prediction errors that may still exist after this process.

Figure 5:
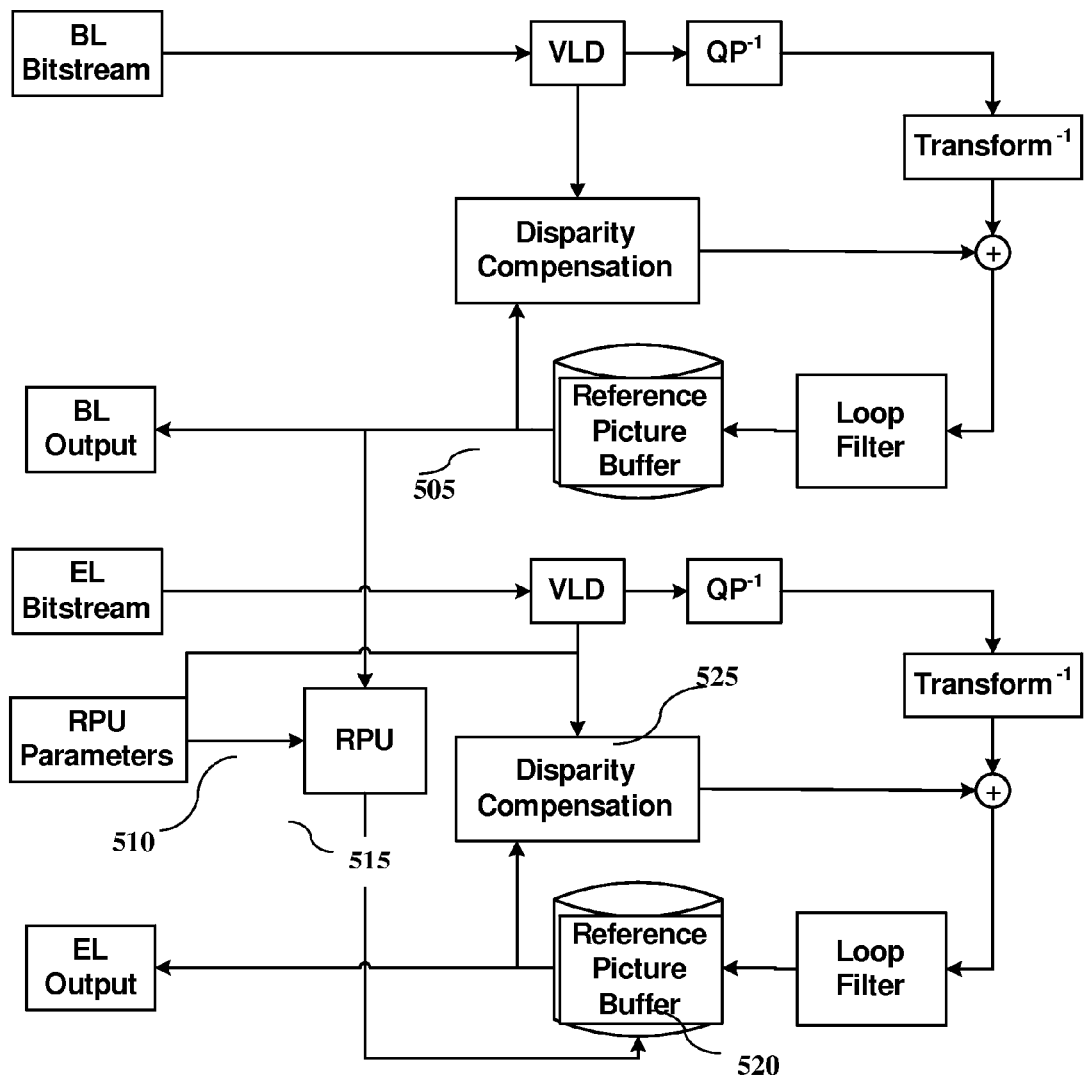
FIG. 5 shows a possible decoder side realization of the architecture of FIGS. 1 and 2.

FIG. 5 shows a diagram with an exemplary decoder implementation that provides support for RPU processing. In this decoder, similar to the encoder shown in FIGS. 3 and 4, the base layer reconstructed image is input to a BL reference picture buffer (505) and is also sent to an RPU (510) and processed to obtain a prediction (515) of the EL image. This prediction is then stored in an EL reference picture buffer (520), and used as necessary during the disparity compensation process (525). In memory constrained devices, however, storing the prediction of the BL in the EL reference picture buffer (520) can be costly to implement. Furthermore, this implementation does not consider how many regions of the base layer are actually referenced by the enhancement layer. It is therefore possible that samples processed by the RPU (510) are never utilized for prediction, therefore resulting in unnecessary processing during decoding. Such processing could be quite costly, especially for power constrained devices or when the best possible decoding performance, in terms of operations per pixel, needs to be achieved.

In accordance with several embodiments of the present disclosure, the memory and processing requirements of the RPU are reduced by integrating the reference processing stage with the disparity compensation process of the decoder.

Figure 6:
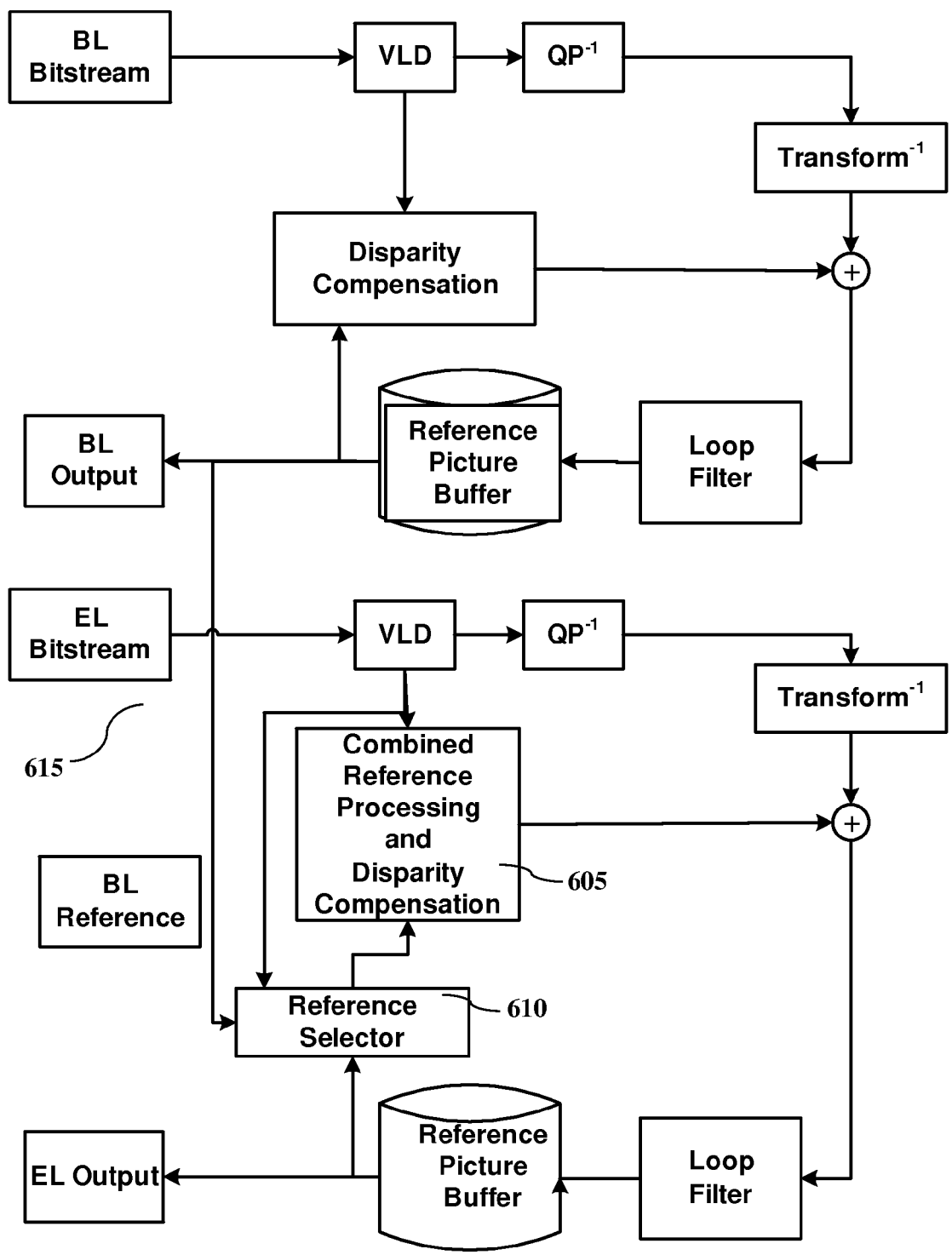
FIG. 6 shows a decoder side realization of an embodiment according to the present disclosure.

FIG. 6 illustrates an embodiment of a decoder architecture in accordance with the present disclosure. Differently from the architecture presented in FIG. 5, the reference processing stage (605) is performed after the reference selection (610) and as part of the disparity compensation process. On the other hand, in the previous architecture shown in FIG. 5 the reference processing (510) was performed prior to reference selection, and the reference selection was performed during the disparity compensation stage (525).

Therefore, a first consequence of the embodiment of FIG. 6 is that there is no need to store the entire processed base layer reference, thus potentially saving memory since the enhancement layer decoder can reference, if needed the same memory addressed by the base layer decoder. A further consequence of the embodiment of FIG. 6 is that decoding operations can also be significantly reduced. The reduction in computational complexity is due to the fact that the reference processing (605) is performed on an "as-needed" basis by the enhancement layer decoder. This is especially useful in cases where, for example, some regions do not require reference processing of the base layer reconstructed image (615) at all since those regions may only consider other types of prediction, such as intra (spatial predictors) or temporal predictors from previously decoded enhancement layer pictures.

The term "disparity" used throughout the present disclosure refers to any type of difference, including temporal disparity, spatial, 2D and 3D, quality disparity, resolution, etc.

Figure 7:
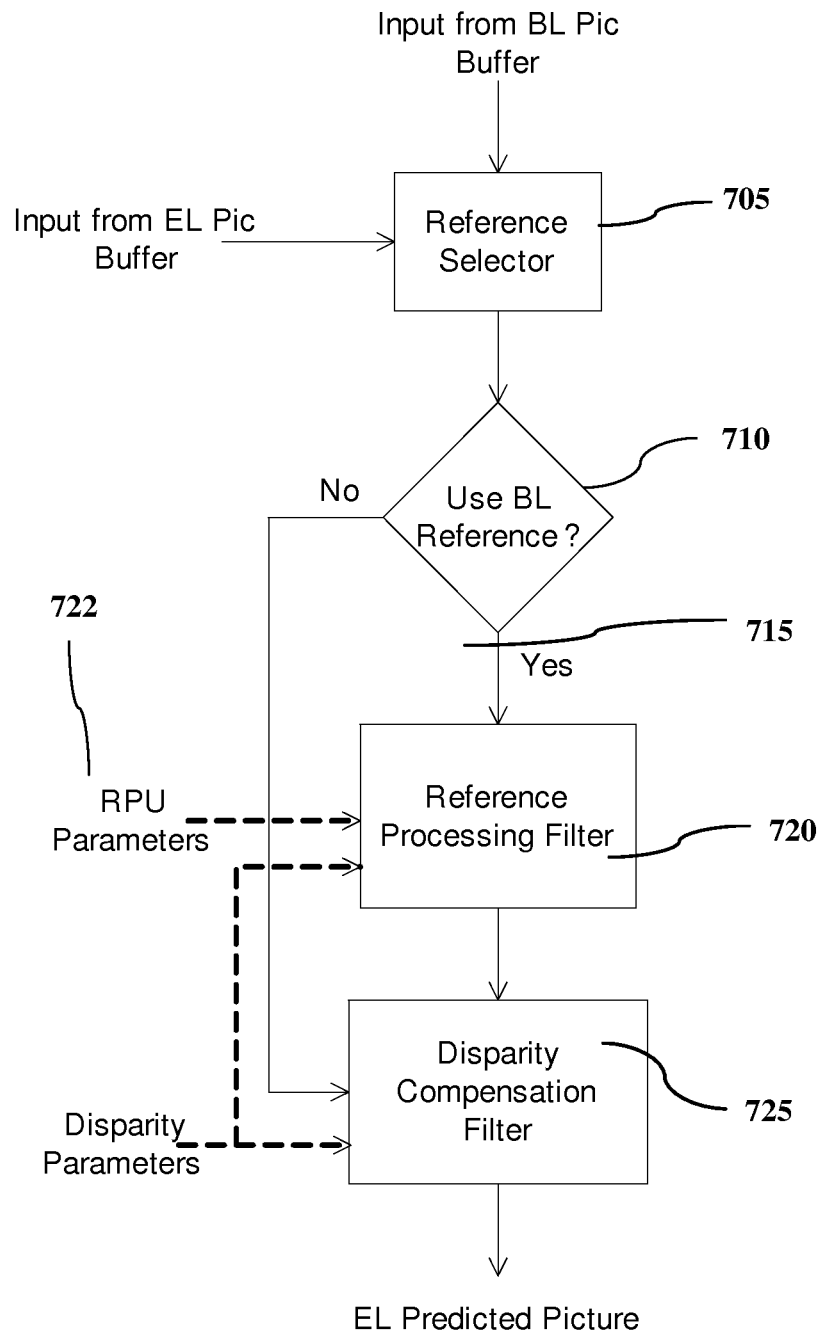
FIGS. 7 and 8 show flow charts related to the decoder side realization of FIG. 6.

In one embodiment, the combined reference processing and disparity compensation process (605) can be implemented as a cascaded filter set as in FIG. 7. In that case, for each image region (e.g., block) of the enhancement layer image to be coded, the reference selector (705) determines (710) whether prediction is derived by referencing the base layer or using a different type of a prediction, such as intra or a temporal predictor. If the base layer reference is used (715), then a reference processing filter (720) is enabled. The particular type of filter (720) can depend on the RPU parameters signaled in the bitstream. The filtering (720) is usually performed in order to obtain the input samples required by the disparity compensation filter (725) and no other samples need to be processed. In other words, the filtering (720) is applied for prediction purposes and is not accounted for visual/display purposes. For example, in the MPEG-4 AVC/H.264 standard, the disparity compensation uses a 6 tap filter for predicting an image sample at a ½ pixel position in the reference. In that case, assuming that the disparity parameter (motion vector) points to a particular ½ pixel position of the reference processed image, only 6 neighboring samples need to be generated in the reference processed image in order to obtain the corresponding disparity compensated enhancement layer prediction of the image sample. Different positions, e.g. integer or quarter pixel positions, may have different requirements in terms of processing of neighboring samples prior to any further processing for motion compensated interpolation. A similar process can be considered for both luma and chroma samples.

Figures 8, 9:
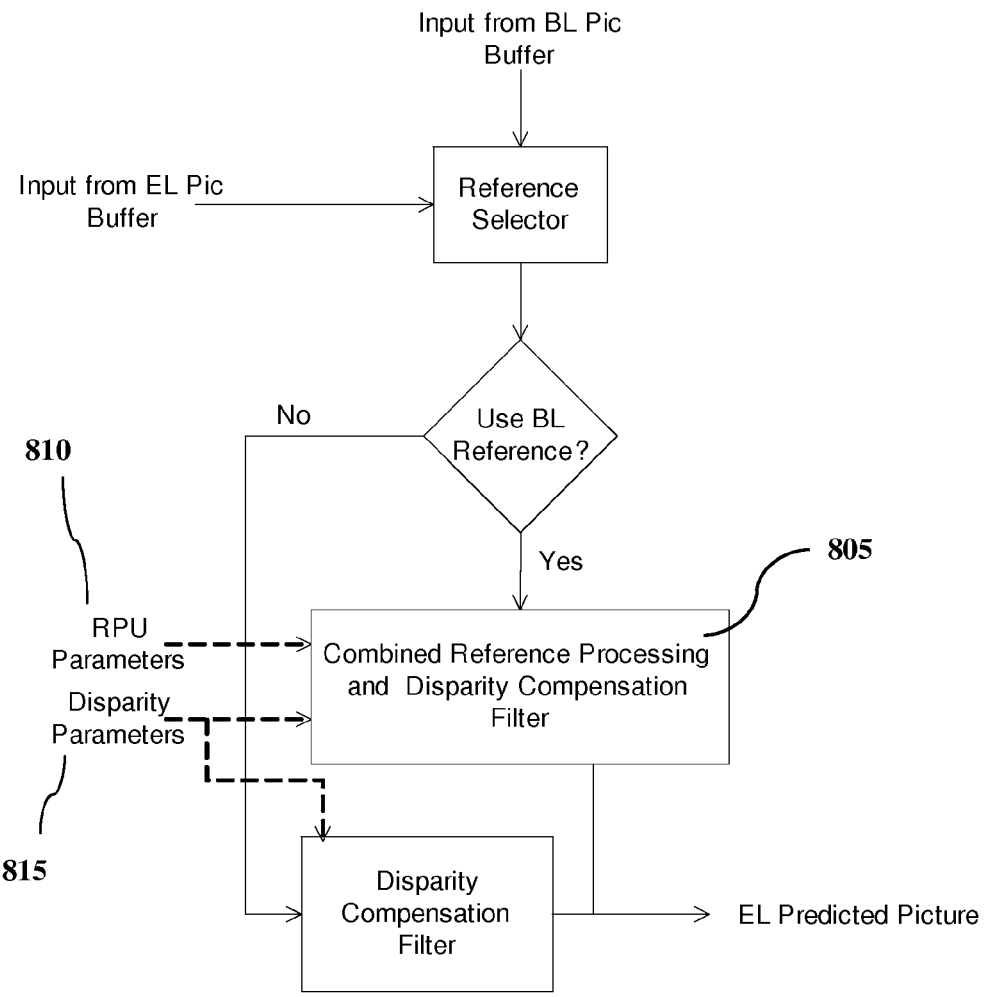
FIG. 9 shows reference processed samples to compute disparity compensated values of two adjacent blocks.

The embodiment of FIG. 7 enables reuse of existing blocks in a decoder, such as the motion compensated interpolation block. The present disclosure provides further embodiments, where the complexity of the system is reduced even further. By way of example, in the embodiment of FIG. 8, the reference processing and disparity compensation filters can be combined together to generate a single filter (805) that performs both tasks. For example, when both the reference processing and disparity compensation are performed using linear filters, the combined filter can be a convolution of the two individual filters. In a different example, a frequency domain filter can be combined together with the interpolation filters, resulting in a filter with different filter coefficients As shown in FIG. 8, the combined filter parameters depend both on the RPU filter parameters (810) and the disparity parameters (815), such as motion vector lengths, generated from the encoded bitstream. Assuming, however, that there is a limited set of possible RPU filter parameters (810) and a limited set of possible disparity compensation filters (815), all of the possible combined filters can be pre-computed and the filter parameters addressed using a look-up table.

In another embodiment, the decoder computational complexity can be reduced by populating a map with some of the previously computed reference processed samples. Reference can be made to the example of FIG. 9 where the disparity compensation process needs to compute the horizontal ½ pixel positions of two 4×4 blocks, Block A and Block B, given a reference. In MPEG-4 AVC this process may involve using a 6 tap filter. As shown in the figure, there is significant overlap in prediction between the reference processed samples 'X' needed to generate Block A, and the samples 'X' needed to generate Block B. Therefore, the decoder can potentially store all of the overlapping samples from those needed to compute Block A, and then re-use them when computing Block B in order to reduce computational complexity. The case in FIG. 9 is an exemplary case only and the same concepts can be applied even when Block A and Block B are non-neighboring, when they are of different sizes, when different disparity compensation filters are used, etc. It should also be noted that in one embodiment, all previously computed reference processed sample data may be stored in a map, while in another embodiment, a pre-analysis of the motion and reference information may be performed at the decoder to determine which reference processed samples need to be stored in the map, and which samples can be discarded. Such pre-analysis can occur by analyzing the bitstream information before performing any motion compensation and residual decoding.

In a further embodiment, and to reduce conditional branching in the decoder that may occur due to such analysis and from having to enable and disable the usage of the RPU at a Macroblock (e.g. 16×16) or subblock (e.g. smaller or equal than 16×16) level, RPU consideration can be done at a region level.

In particular, instead of RPU processing and storing an entire reference picture, only some regions of a picture can be processed. In accordance with such embodiment, the decoder analyzes the bitstream first to find "RPU" related MBs and then generates the RPU processed reference keeping that information in mind. If for example it is known that some area will never be used for prediction, such area is not processed. On the other hand, if an area is used for prediction by one or more Macroblocks, then the samples belonging to this area are generated.

Figure 10:
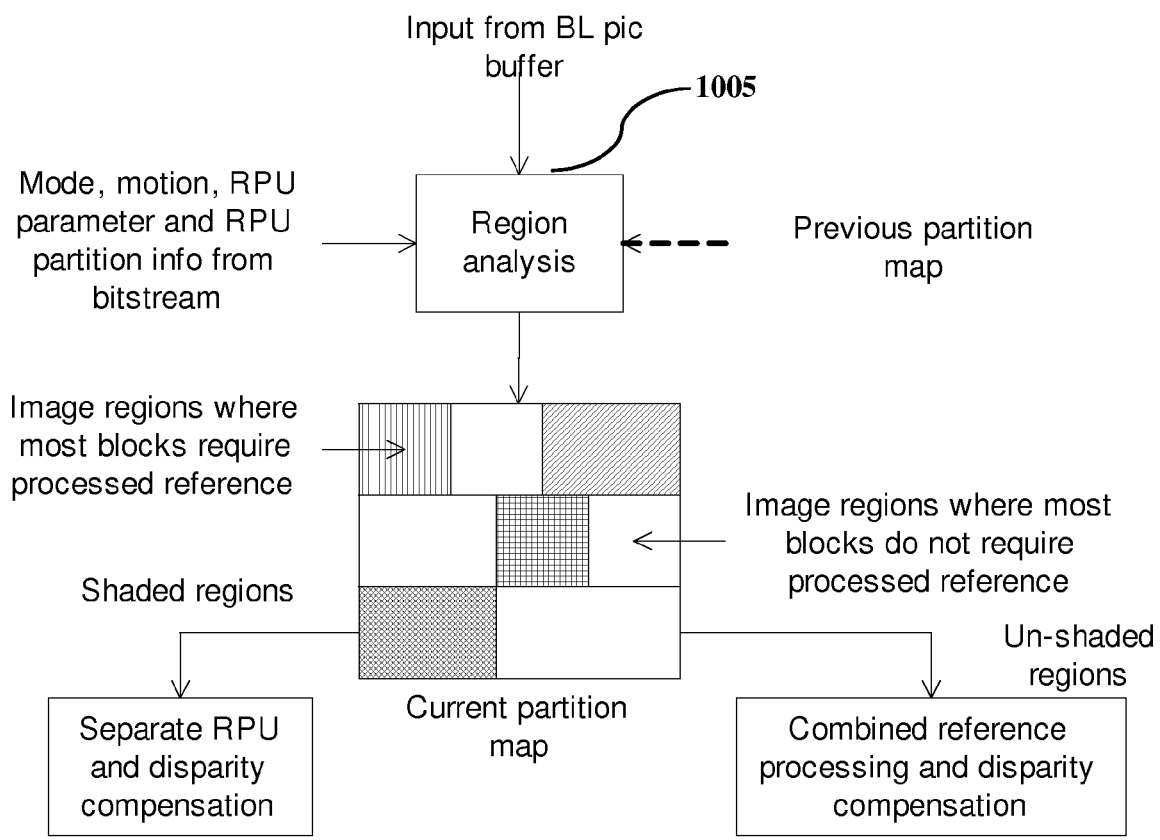
FIG. 10 shows a diagram of an embodiment where pre-analysis is performed to separate image regions where most blocks do not require a processed reference from image regions where most blocks require a processed reference.

Reference can be made to the embodiment of FIG. 10, where the decoder first determines (1005) which Macroblocks require RPU processing. The decoder then also can partition (1010) the picture or slice to be decoded in different regions (1015, 1020). Partitioning can be fixed (e.g., corresponding to N×M macroblocks) or adaptive given, for example, the information from the RPU usage analysis and where the regions are split (usually in rectangular regions) in a manner as to contain as many as possible adjacent blocks that utilize RPU processing. In this way, the decoder can either only process from the beginning, as in FIG. 5, only those regions that have macroblocks utilizing RPU processing, or appropriately schedule the cascaded or combined versions of the RPU processing during decoding with a lower cost. This can be done, for example, by utilizing a smaller size and maybe faster memory that might be available in the system. A hybrid method could also be considered.

In such method, i.e. processing of some regions that utilize RPU processing heavily is performed prior to motion compensation, while RPU processing of isolated regions is performed "on the fly." One simple method to determine the regions that require RPU processing is to analyze the reference information in the bitstream. In that case, regions corresponding to those in which most blocks/sub-regions require RPU processed samples can be chosen for RPU processing. In addition to the reference information, motion/disparity vector information may also be used to generate a more accurate map of the regions that require RPU processing. Note that the region computation may be performed after analyzing the bitstream for the entire image, or for each slice, or even for a portion of a slice.

It may also be possible that instead of or in addition to performing analysis of the bitstream to determine which regions should utilize RPU processing and which should not, the determination of such regions can be based on previously decoded pictures or slices. In particular, it is very likely that two adjacent pictures, especially if they are coded with similar tools, would have similar characteristics. If the first decoded picture relies heavily on RPU processing then it is also likely that the second picture would do so as well. In that scenario, there might be a benefit to decode this picture by utilizing the method presented in FIG. 5. However, if the first picture does not utilize RPU processing, or utilizes RPU processing sporadically, then any of the "on-the-fly" methods in accordance with the present disclosure should be preferred. Such decision can also be enhanced by analyzing the bitstream and determining how similar are the bits or modes of the second picture or slice vs the first.

Figure 11:
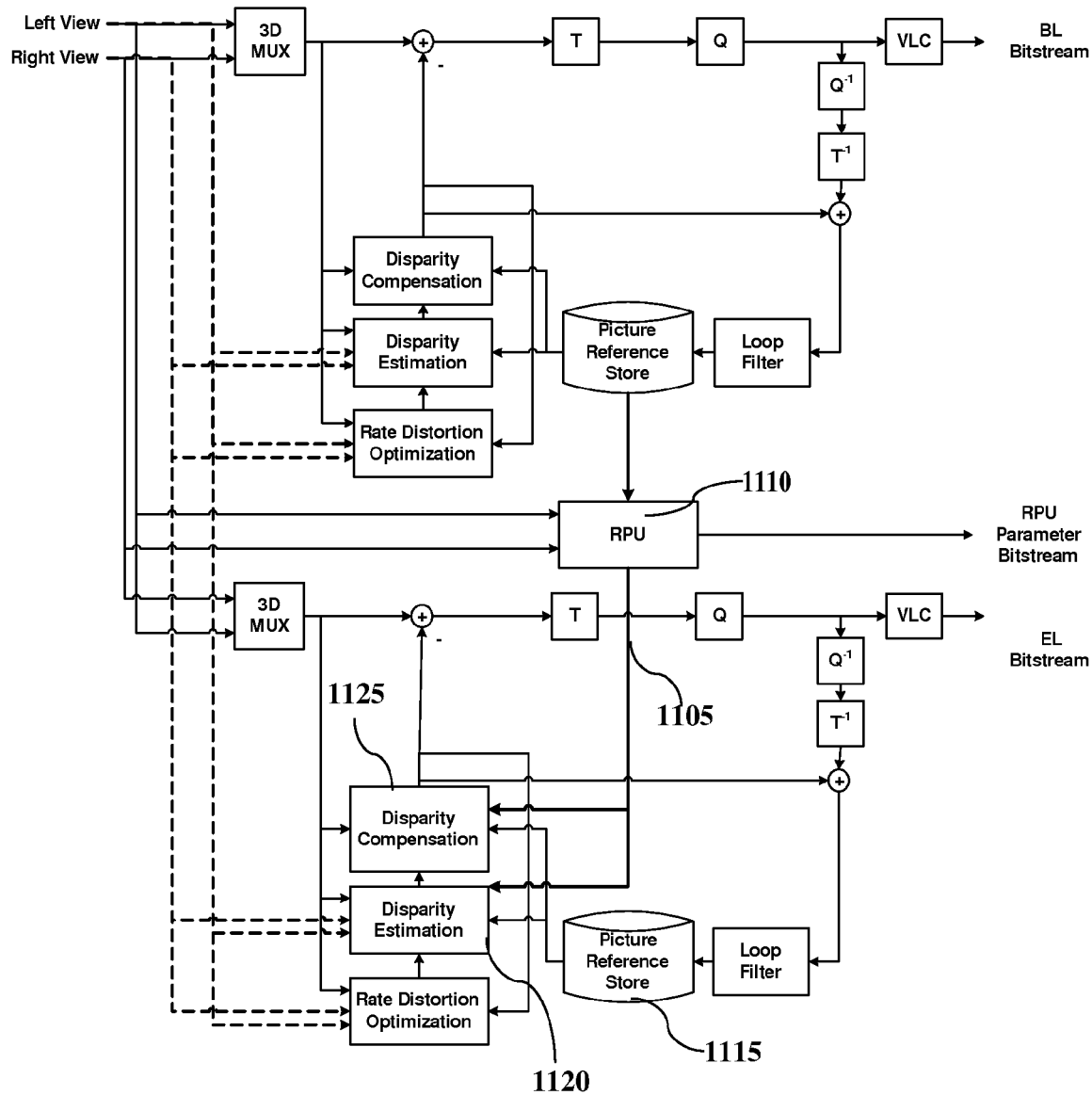
FIG. 11 shows a first encoder size realization of an embodiment according to the present disclosure.
Figure 12:
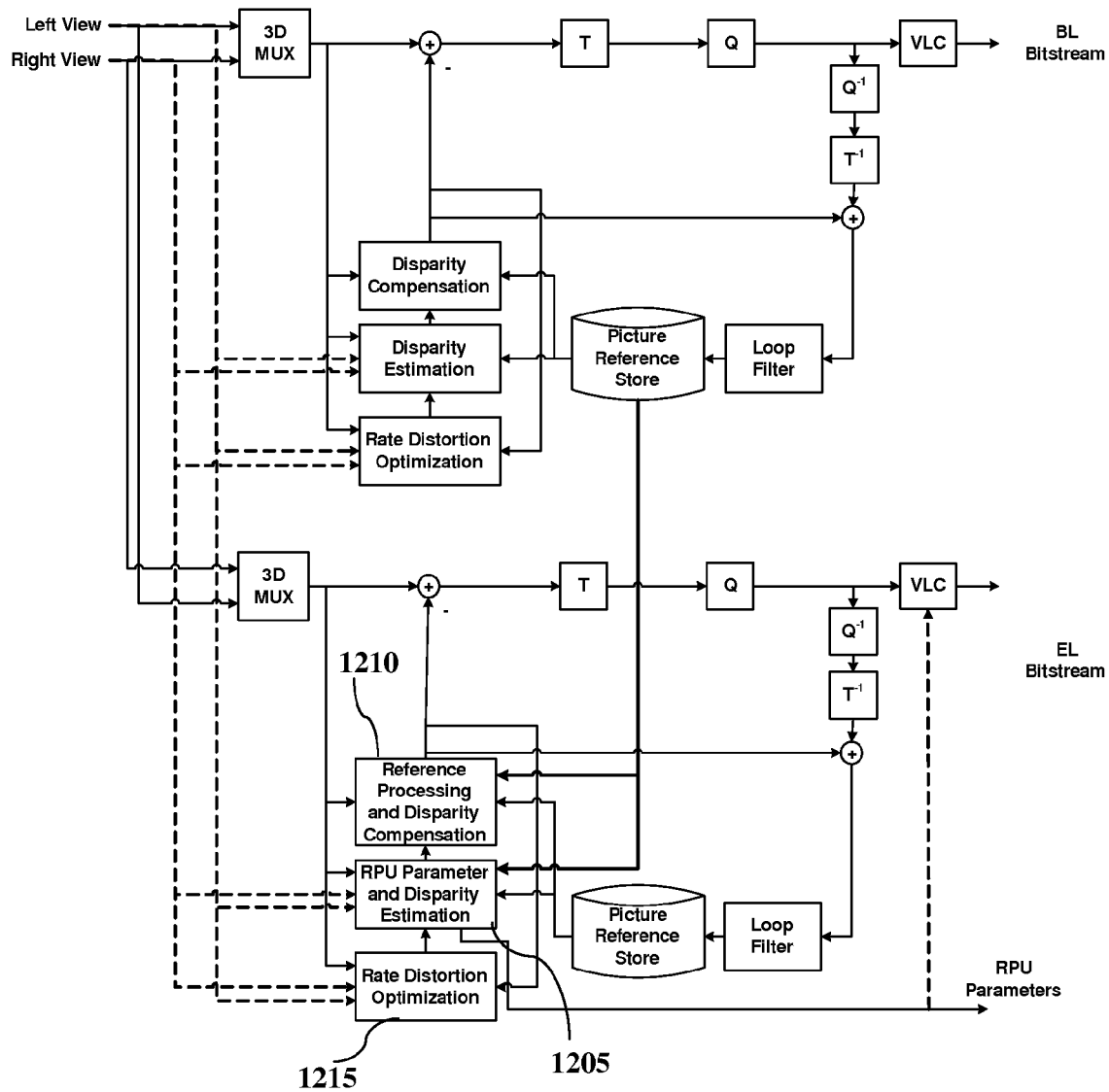
FIG. 12 shows a second encoder size realization of an embodiment according to the present disclosure.

In the following paragraphs, encoder architectures in accordance with embodiments of the present disclosure will be shown. As later discussed in additional detail, as shown in FIGS. 11 and 12, the encoder avoids performing RPU processing or storing the RPU reference, unless it is necessary for final disparity compensation. Decisions in the disparity estimation process can use the original (not processed) reference (see, e.g., FIG. 12) or a simpler processed reference (see, e.g., FIG. 11) avoiding either additional memory or complexity. Such decisions could also utilize a cascaded or combined version of the methods of FIGS. 11 and 12 as well. For example, the process can be combined with a fast mode decision, where it may be determined that checking a particular reference is not necessary, thus saving computation cycles.

As shown in the embodiment of FIG. 11, the processed reference (1105) from the RPU (1110) is not inserted into the enhancement layer reconstructed picture buffer (1115) but is directly used in the rate distortion optimization loop for disparity estimation (1120), and compensation (1125). Depending on the mode and reference selection specified by the RDO module, the disparity estimation module (1120) estimates the disparity parameters (e.g., motion vectors, illumination parameters) for the specified reference. The disparity compensation module (1125) uses the estimated disparity parameters to obtain a prediction of the current image from the specified reference.

In another embodiment, as also mentioned before and illustrated in FIG. 12, the encoder may also avoid performing the full RPU process prior to distortion estimation (1205) but instead perform the RPU process within the rate distortion optimization loop as part of the disparity compensation (1210). In that case, the disparity and RPU parameter estimation module (1205) may either perform simple disparity estimation, if the provided reference is not an RPU processed reference from the lower layer, or it may perform the RPU process as needed. If RPU processed samples are used for the disparity estimation, then the reference processing and disparity compensation module (1210) will use the reference processed samples for disparity compensation, and otherwise, it will use samples from the temporal references in the enhancement layer reference picture buffer. This can be beneficial, for example, if early termination criteria are used during mode decision by the rate distortion optimization process. In that case, the rate distortion optimization process (1215) may determine that for one or more regions of the image, the temporal predictors are sufficiently accurate given the bit rate constraint to provide the necessary video quality, and therefore, choose to not test the rate-distortion characteristics of using the RPU processed predictions for that region. Therefore, by performing the RPU process within the mode decision loop, it is possible to significantly reduce the computational complexity and/or memory requirements at the encoder as well. The encoder, of course, also has the flexibility to consider a lesser complexity filter, e.g. a shorter 1D or 2D filter, a fixed filter instead of the explicit filter etc, to perform any decisions, either through full preprocessing or through "on-the-fly" processing, determine if the base layer reference is useful or not, and only if the base layer is selected as a reference, then the optimal filter is used to process the base layer for the final motion compensation step.

In conclusion, this disclosure presents a method that significantly reduces the computational complexity and memory requirements for the reference processing stage of a codec that uses an RPU, and thereby brings the hardware and software implementation cost of such a codec to be of a similar order as a codec that does not contain a provision for an RPU. Applications of the teachings of the present disclosure include but are not limited to video encoding and decoding (hardware and software) devices, video disc players (e.g Blu-ray players), broadcast, satellite, mobile 3D video devices, IPTV systems, etc. The person skilled in the art will also understand that the teachings of the present disclosure can apply to a variety of systems and/or architectures, such as frame-compatible 3D video systems, 2D compatible 3D video systems, 2D scalable video system, 2D or 3D multi-view systems, and so on.

The methods and systems described in the present disclosure may be implemented in hardware, software, firmware or combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

The invention claimed is:

1. A multi-layered video decoding system comprising:
    one or more inputs for accessing one or more layers of a coded bitstream to be decoded;
    a first layer, comprising a first layer video decoder, the first layer video decoder comprising a first layer reference picture buffer;
    a second layer, associated with the first layer, the second layer comprising a second layer video decoder, the second layer video decoder comprising a second layer reference picture buffer;
    a reference processing selector connected to the first layer reference picture buffer and the second layer reference picture buffer, to select whether to process the output reference pictures of the first layer video decoder and input the processed output reference pictures of the first layer video decoder into the second layer video decoder or not, wherein the reference processing selector comprises a region analysis module to analyze regions of an image and select which regions of the image to process or not to process within the image and select separate processing in accordance with the analysis performed on the regions;
    a processing module, located downstream of the reference processing selector, to process, upon instruction of the reference processing selector, the output reference pictures of the first layer video decoder and input the processed output reference pictures into the second layer video decoder, the processing module comprising a reference processing filter and a disparity compensation filter;
    wherein the processing module performs disparity compensation with reference processing when the output reference pictures of the first layer video decoder is processed, and the processing module performs disparity compensation without reference processing when the output reference pictures of the first layer video decoder is not processed.

2. The multi-layer video decoding system as recited in claim 1, wherein the region analysis module analyzes the regions of the image to separate the image between regions having a majority of components for which processing is required and regions having a majority of components for which processing is not required.

3. The multi-layer video decoding system as recited in claim 2, wherein the video decoding system is adapted to process the regions of the image separately from the processing module or in a combined manner with the processing filter and the disparity compensation filter.

4. The multi-layer video decoding system as recited in claim 3, wherein the image regions having a majority of components for which processing is required are processed by the processing module separately from the disparity compensation module, and the image regions having a majority of components for which processing is not required are processed by the processing module in a combined manner with the reference processing filter and the disparity compensation filter.

5. The multi-layer video decoding system as recited in claim 2, wherein the region analysis module receives a second layer bitstream input and defines the regions on the basis of reference picture information provided in the second layer bitstream input.

6. The multi-layer video decoding system as recited in claim 5, wherein the region analysis module defines the regions on the basis of a combination of reference picture information and motion vector or disparity vector information.

7. The multi-layer video decoding system as recited in claim 5, wherein the region analysis module defines the regions on the basis of the second layer bitstream input for the image, for a slice of the image, or for a portion of a slice of the image.

8. The multi-layered video decoding system as recited in claim 1, wherein determination by the second layer video decoder of not processed regions is based on previously decoded pictures or slices or second layer bitstream information.

9. The multi-layered video decoding system as recited in claim 1, wherein the first layer comprises a base layer, the second layer comprises an enhancement layer, and the multi-layered video decoding system comprises a system comprising a base layer and one or more enhancement layers.

10. The multi-layered video decoding system as recited in claim 1, wherein the first layer comprises a first enhancement layer, the second layer comprises a second enhancement layer, and the multi-layered video decoding system comprises a system comprising a base layer and a plurality of enhancement layers.

11. The multi-layered video system as recited in claim 1, wherein the system comprises at least one of:
    a frame-compatible three-dimensional (3D) video system;
    a two-dimensional (2D) compatible 3D video system;
    a 2D scalable video system; or
    a 2D or 3D multi-view system.

* * * * *